(12) United States Patent
Iwayama

(10) Patent No.: US 9,088,680 B2
(45) Date of Patent: Jul. 21, 2015

(54) IMAGE READING DEVICE AND IMAGE READING METHOD

(75) Inventor: Akira Iwayama, Ishikawa (JP)

(73) Assignee: PFU Limited, Ishikawa (JP)

( * ) Notice: Subject to any disclaimer, the term of this patent is extended or adjusted under 35 U.S.C. 154(b) by 118 days.

(21) Appl. No.: 13/045,149

(22) Filed: Mar. 10, 2011

(65) Prior Publication Data

US 2011/0279840 A1    Nov. 17, 2011

(30) Foreign Application Priority Data

May 12, 2010    (JP) .................................. 2010-110123

(51) Int. Cl.
*G06K 15/00*    (2006.01)
*H04N 1/00*    (2006.01)

(52) U.S. Cl.
CPC ......... *H04N 1/00588* (2013.01); *H04N 1/0066* (2013.01); *H04N 1/00657* (2013.01)

(58) Field of Classification Search
CPC .......... H04N 1/00588; H04N 1/00657; H04N 1/0066
USPC ...................... 358/1.12, 1.15, 3.28
See application file for complete search history.

(56) References Cited

U.S. PATENT DOCUMENTS

| 2009/0086236 | A1* | 4/2009 | Ohmiya | 358/1.12 |
| 2009/0091773 | A1* | 4/2009 | Kushida | 358/1.12 |
| 2010/0110497 | A1* | 5/2010 | Ohmiya | 358/3.28 |
| 2011/0279840 | A1* | 11/2011 | Iwayama | 358/1.12 |

FOREIGN PATENT DOCUMENTS

| JP | 09-086713 | 3/1997 |
| JP | 10-200703 A | 7/1998 |
| JP | 10-294833 | 11/1998 |
| JP | 2001-022138 A | 1/2001 |
| JP | 2006-246060 A | 9/2006 |
| JP | 2007-311890 | 11/2007 |
| JP | 4372060 | 11/2009 |
| JP | 2010-016682 | 1/2010 |

OTHER PUBLICATIONS

Japanese Office Action issued in Japanese Application No. 2010-110123, Date Mailed Feb. 12, 2014, with English Translation.

* cited by examiner

*Primary Examiner* — Ashish K Thomas
*Assistant Examiner* — Bharatkumar Shah
(74) *Attorney, Agent, or Firm* — McDermott Will & Emery LLP

(57) ABSTRACT

An image reading device includes a first conveying unit that sequentially feeds a plurality of media placed in a tray one by one in a conveying direction, a second conveying unit disposed downstream of the first conveying unit in the conveying direction and conveys a medium among the plurality of media fed by the first conveying unit in the conveying direction, and an imaging unit disposed downstream of the second conveying unit in the conveying direction. The imaging unit captures an image of the medium conveyed thereto and generates image data of the medium.

The image reading device detects the medium conveyed based on the image data, and stops conveying a next medium subsequent to the medium conveyed before the first conveying unit starts conveying the next medium. The image reading device resumes conveying the next medium when the medium conveyed is no longer detected based on the image data.

11 Claims, 7 Drawing Sheets

IMAGE READING DEVICE AND IMAGE READING METHOD

CROSS-REFERENCE TO RELATED APPLICATIONS

This application is based upon and claims the benefit of priority from Japanese Patent Application No. 2010-110123, filed May 12, 2010, the entire contents of which are incorporated herein by reference.

BACKGROUND OF THE INVENTION

1. Field of the Invention

The present invention relates to an image reading device and an image reading method.

2. Description of the Related Art

An image reading device that sequentially conveys a plurality of media and captures images of the media is known. Japanese Patent No. 4372060 discloses a technology for an image reading device including document conveying means for conveying a plurality of documents one by one and reading means for reading the images on the documents and outputting the read image data.

When a plurality of media are sequentially conveyed, defective image, for example, may occur if the intervals between the media are small. The defective image can be suppressed by increasing the intervals between the media. However, excessively large intervals between the media cause a reduction in reading speed. It is therefore desirable to appropriately determine the intervals between the media.

SUMMARY OF THE INVENTION

It is an object of the present invention to at least partially solve the problems in the conventional technology.

An image reading device of the present invention comprises a first conveying unit that sequentially feeds a plurality of media placed in a tray one by one in a conveying direction, a second conveying unit that is disposed downstream of the first conveying unit in the conveying direction and conveys, in the conveying direction, the plurality of media fed one by one by the first conveying unit, and an imaging unit that is disposed downstream of the second conveying unit in the conveying direction, captures an image of a medium conveyed thereto and generates image data of the medium, wherein, the image reading device is configured to detect the medium conveyed based on the image data when the medium is conveyed by the first conveying unit and the second conveying unit, and configured to stop conveying a next medium subsequent to the medium conveyed before the first conveying unit starts conveying the next medium, and to resume conveying the next medium when the medium conveyed is no longer detected based on the image data.

An image reading device according to another aspect of the present invention comprises an automatic document feeder that sequentially feeds a plurality of media placed in a tray one by one in a conveying direction, a first conveying unit that is disposed downstream of the automatic document feeder in the conveying direction and conveys a medium fed from the automatic document feeder in the conveying direction, a second conveying unit that is disposed downstream of the first conveying unit in the conveying direction and conveys the medium fed by the first conveying unit in the conveying direction, and an imaging unit that is disposed downstream of the second conveying unit in the conveying direction, captures an image of the medium conveyed and generates image data of the medium, wherein, the image reading device is configured to detect the medium conveyed based on the image data when the medium is conveyed by the first conveying unit and the second conveying unit, and configured to stop driving the first conveying unit and the automatic document feeder before the first conveying unit starts conveying a next medium subsequent to the medium conveyed, and to resume driving the first conveying unit and the automatic document feeder when the medium conveyed is no longer detected based on the image data.

An image reading method according to still another aspect of the present invention includes steps of feeding a plurality of media placed in a tray one by one in a conveying direction by a first conveying unit, conveying a medium among the plurality of media fed in the feeding toward an imaging unit until the medium is captured by the imaging unit, using the first conveying unit and a second conveying unit which is disposed downstream of the first conveying unit in the conveying direction, capturing an image of the medium conveyed to generate image data of the medium conveyed and detecting the medium conveyed based on the image data, after detecting the medium conveyed based on the image data, stopping conveying a next medium fed subsequent to the medium conveyed before the first conveying unit starts conveying the next medium, and conveying the next medium, when the medium conveyed is no longer detected based on the image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Image reading devices and image reading methods according to preferred embodiments of the present invention will now be described in detail with reference to the drawings. However, the invention is not limited to the preferred embodiments. The components in the following embodiments include those readily apparent to persons skilled in the art and those substantially similar thereto.

First Embodiment

Figure 1:
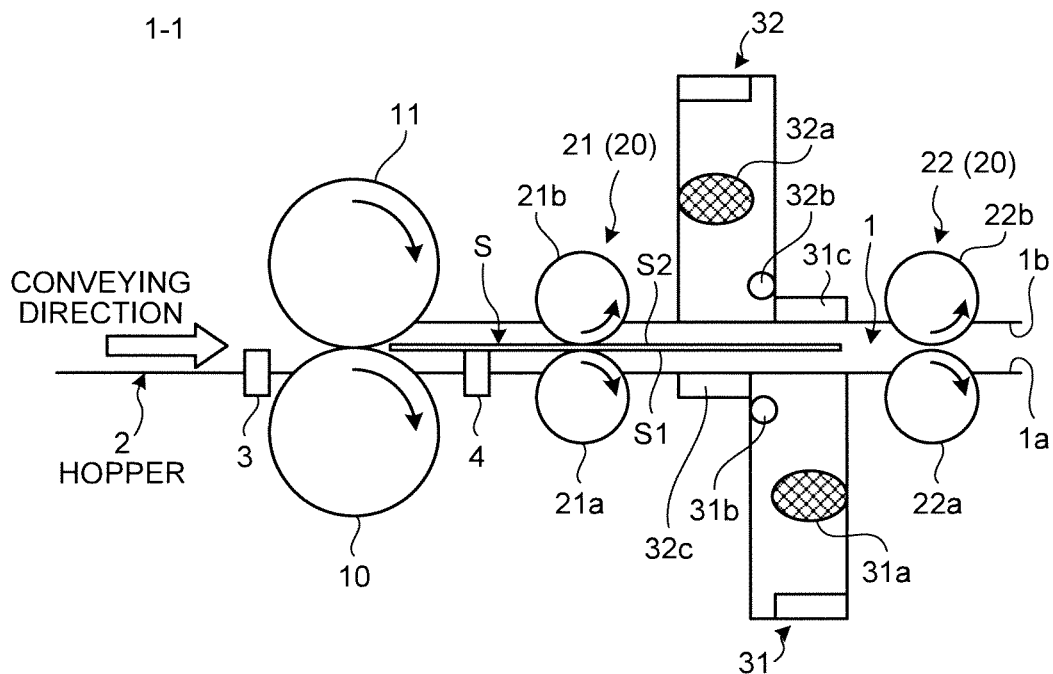
FIG. 1 is a diagram illustrating the schematic structure of an image reading device according to a first embodiment.
Figure 2:
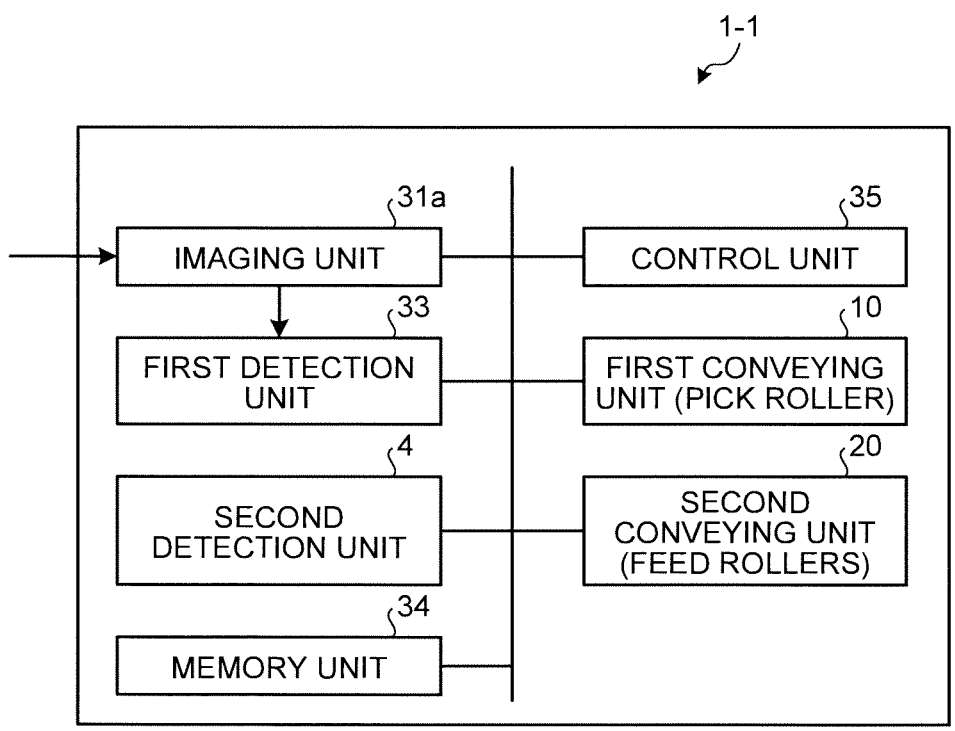
FIG. 2 is a diagram illustrating the system configuration of the image reading device of the first embodiment.
Figure 3:
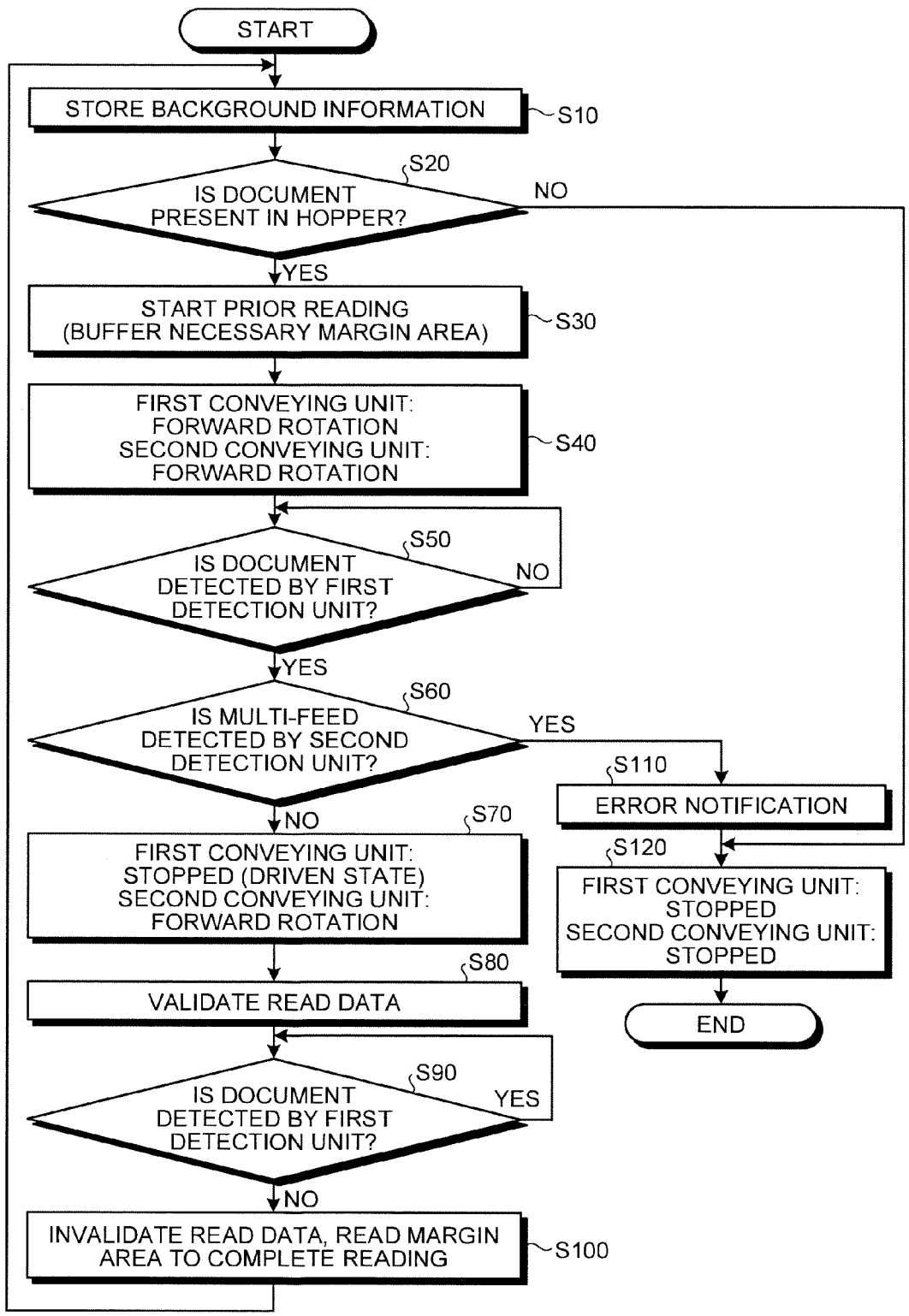
FIG. 3 is a flowchart showing the operation of the image reading device of the first embodiment.

A first embodiment will be described with reference to FIGS. 1 to 7. This embodiment relates to an image reading device that sequentially conveys a plurality of media and reads images on the plurality of media and to an image reading method. FIG. 1 is a diagram illustrating the schematic structure of the image reading device according to the first embodiment, FIG. 2 is a diagram illustrating the system configuration of the image reading device of the first embodiment, and FIG. 3 is a flowchart showing the operation of the image reading device of the first embodiment.

In an image reading device of an ADF (automatic document feeder or auto document feeder) type, defective image, i.e., an image including a part which is not captured, may occur in reading the images when the media or sheets are conveyed with small intervals between the sheets, and therefore reading must be performed with certain intervals between the sheets. However, if the intervals between the sheets are larger than required, a speed of reading is reduced.

In an image reading device 1-1 of the first embodiment, the image scan area for each of media is determined according to image data read by an imaging unit 31a, when reading the images of the media for every one of the media. More specifically, the image reading device 1-1 includes a first conveying unit including a pick roller 10 and a separation roller 11, a second conveying unit including upstream feed rollers 21, and a first detection unit 33 that reads the image of a medium such as a paper sheet to generate image data and detects the leading and trailing ends of the medium from the image data. Upon detection of the leading end of a document, the image reading device 1-1 validates the data read by the imaging unit 31a to start reading the image and stops the pick roller 10 to bring the pick roller 10 into a driven state. Upon detection of the trailing end of the document, the read data is invalidated, and the image reading device 1-1 finish reading the image. After finishing reading the image, when there is another document or next sheet to be read, the image reading device 1-1 actuates the pick roller 10 and starts reading the next sheet.

In the first embodiment, the image reading device 1-1 detects, according to the image data, a timing at which the image data starts to include the image of the medium, i.e., the timing at which the leading end of the medium passes through the reading line of the imaging unit. The image reading device 1-1 also detects, according to the image data, a timing at which the image data no longer includes the image of the medium, i.e., the timing at which the trailing end of the medium passes through the reading line of the imaging unit. Therefore, in contrast to the case in which the timing of the passage of a medium is detected by, for example, a mechanical sensor, the leading and trailing ends of the medium can be reliably detected even when the medium is skewed. Therefore, in the image reading device 1-1 of the first embodiment, the intervals between sheets can be controlled to the minimum necessary.

The image reading device 1-1 of the first embodiment, as disclosed in FIG. 1, includes an auto feeder-type reading mechanism (an ADF-type image reading mechanism) that feeds stacked sheet-shaped media continuously and moves the media relative to a fixed line image sensor to read image information or image data on the media. The image reading device 1-1 further includes a conveying passage 1, a hopper 2, the pick roller 10, feed rollers 20, a first optical unit 31, and a second optical unit 32.

The conveying passage 1 is configured to guide the sheet-shaped medium S conveyed in a conveying direction. The conveying passage 1 has a guide surface 1a that faces the first surface S1 of the medium S and a guide surface 1b that faces the second surface S2 of the medium S. A predetermined gap is formed between the guide surfaces 1a and 1b, and the medium S is conveyed between the guide surfaces 1a and 1b.

The hopper 2 is a tray on which media S to be read are placed. The hopper 2 serves as a placement stage on which a plurality of stacked media S can be placed. The hopper 2 is provided with an empty-detecting sensor 3. The empty-detecting sensor 3 is used to detect the media S placed in the hopper 2, and outputs a signal indicating that the hopper 2 is in an empty state, when no medium S is detected.

The pick roller 10 is used to send the medium S, which is one of the media S, placed in the hopper 2 to the conveying passage 1. The separation roller 11 is paired with the pick roller 10, and the outer circumferential surface of the separation roller 11 and the outer circumferential surface of the pick roller 10 face each other. The pick roller 10 is a conveying roller that rotates in a direction (forward direction) that causes conveying force directed in the conveying direction to be exerted on the medium S sandwiched between the separation roller 11 and the pick roller 10. The pick roller 10 can switch between a driving state in which the conveying force directed in the conveying direction is exerted on the medium S and a non-driving state in which the conveying force is not exerted on the medium S. The pick roller 10 is driven by a motor which is not shown in the drawings. When driven by the motor, the pick roller 10 is in the driving state and rotates in the forward direction. When the motor stops driving the pick roller 10, it is brought into the non-driving state and does not exert the conveying force on the medium S.

The separation roller 11 is provided to exert force directed in a direction opposite to the conveying direction on the medium S sandwiched between the separation roller 11 and the pick roller 10. The separation roller 11 includes a torque limiter which is not shown in the drawings. When a rotation torque equal to or greater than a predetermined value is applied to the separation roller 11, this rotation torque causes the separation roller 11 to rotate.

When the medium S is sandwiched between the separation roller 11 and the pick roller 10, the conveying force is transmitted from the pick roller 10 through the medium S to the separation roller 11, and a rotation torque is thereby exerted on the separation roller 11. When a plurality of overlapping media S are sandwiched between the separation roller 11 and the pick roller 10, the rotation torque exerted on the separation roller 11 is smaller than the limit torque of the separation roller 11. Therefore, the separation roller 11 does not rotate, and media S not in contact with the pick roller 10 are separated from the medium S in contact with the pick roller 10. This prevents a plurality of overlapping media S from being fed from the hopper 2 to the conveying passage 1.

When only one medium S is sandwiched between the separation roller 11 and the pick roller 10, the rotation torque exerted on the separation roller 11 through the medium S is greater than the limit torque. Therefore, the separation roller 11 is allowed to rotate to convey the medium S in the conveying direction. In this case, the separation roller 11 is driven by the rotation of the pick roller 10. As described above, the pick roller 10 and the separation roller 11 function as a separation-conveying mechanism that separates media S one by one from a plurality of stacked media S and feeds them sequentially in the conveying direction.

When the pick roller 10 is driven by the motor, the pick roller 10 and the separation roller 11 feed and convey a plurality of reading target media S placed in the hopper 2 one by one in the conveying direction. When the pick roller 10 is in the driving state, one of the media S stacked in the hopper 2, which is in contact with the pick roller 10, is sent to the conveying passage 1. After the one medium S has been sent, the next medium S in contact with the pick roller 10 is sent to the conveying passage 1. In this manner, the media S placed in the hopper 2 are sequentially sent to the conveying passage 1 one by one.

The feed rollers 20 disposed in the conveying passage 1 are placed on a downstream side of the pick roller 10 in the conveying direction. The feed rollers 20 include the upstream feed rollers 21 and downstream feed rollers 22. The upstream feed rollers 21 are disposed on the upstream side of the downstream feed rollers 22 in the conveying direction. The upstream feed rollers 21 and the downstream feed rollers 22 include respective pairs of rollers, i.e., a pair of rollers 21a, 21b and a pair of rollers 22a, 22b.

The upstream feed rollers 21 convey the medium S, which has been sent to the conveying passage 1 by the pick roller 10, in the conveying direction toward the imaging unit 31a. The upstream feed rollers 21 include a driving roller 21a that is driven to rotate and a driven roller 21b that is supported while being pressed against the driving roller 21a. The driving roller 21a and the driven roller 21b are disposed on opposite sides of the conveying passage 1 for interposing the conveying passage 1 between the rollers 21a and 21b so that the rollers 21a and 21b sandwich the medium S conveyed between the rollers 21a and 21b. The driving roller 21a is disposed on the lower side of the conveying passage 1 and comes in contact with the first surface S1 of the medium S, and the driven roller 21b is disposed on the upper side of the conveying passage 1 and comes in contact with the second surface S2 of the medium S. The driving roller 21a rotates in a rotation direction that causes conveying force directed in the conveying direction to be exerted on the medium S sandwiched between the driving roller 21a and the driven roller 21b.

The downstream feed rollers 22 are provided to further convey the medium S, which has been conveyed by the upstream feed rollers 21, in the conveying direction and discharge the medium S from the conveying passage 1. The downstream feed rollers 22 include a driving roller 22a and a driven roller 22b, similarly to the upstream feed rollers 21. The medium S conveyed by the pick roller 10 is conveyed in the conveying direction by the upstream feed rollers 21 and the downstream feed rollers 22.

A second detection unit 4 is provided in the conveying passage 1 and disposed between the pick roller 10 and the upstream feed rollers 21 in the conveying passage 1. The second detection unit 4 detects multi-feed, namely double feed, of media S. The second detection unit 4 is, for example, a through beam sensor or an ultrasonic sensor. When an ultrasonic sensor is used as the second detection unit 4, the second detection unit 4 irradiates the medium S with ultrasonic waves to detect a change in the amount of the ultrasonic waves when they pass through the medium S. The level, detected by the second detection unit 4, when only one medium S is conveyed by the pick roller 10 is different from the detected level when a plurality of overlapping media S are conveyed by the pick roller 10. The second detection unit 4 detects the multi-feed of media S according to the detected level. In the first embodiment, the provision of the second detection unit 4 allows improvement of the accuracy of detecting the medium S. However, the image reading device 1-1 is not limited to the first embodiment. The image reading device 1-1 may not be provided with the second detection unit 4. Even when the image reading device 1-1 is not provided with the second detection unit 4, the intervals between media can be appropriately set.

The first optical unit 31 and the second optical unit 32 are imaging units for capturing the image of the medium S conveyed. The first optical unit 31 and the second optical unit 32 are disposed between the upstream feed rollers 21 and the downstream feed rollers 22 in the conveying direction. The first optical unit 31 includes the imaging unit 31a, a light source 31b, and a backing section 31c. The imaging unit 31a and the light source 31b are disposed at positions facing the first surface S1 of the medium S conveyed. The backing section 31c is disposed at a position facing the second surface S2 of the medium S conveyed. The light source 31b emits light to the first surface S1 of the medium S.

The imaging unit 31a captures the image of the first surface S1 of the medium S conveyed to generate image data. The imaging unit 31a is a line sensor that optically scans a reading line in a predetermined main scanning direction to generate an electric signal and then outputs the signal as image line data. The reading line is orthogonal to the conveying direction and parallel to the first surface S1 of the medium S conveyed. The backing section 31c is disposed at a position corresponding to the reading line of the imaging unit 31a. Therefore, when no media is present on the reading line, the imaging unit 31a scans the backing section 31c and generates line image data of the backing section 31c. The backing section 31c is used as white reference for image data, and image calibration or adjustment such as shading is carried out according to the image data of the backing section 31c.

The second optical unit 32 is substantially similar to the first optical unit 31. However, the second optical unit 32 captures the image of a surface different from the surface imaged by the first optical unit 31. More specifically, in the second optical unit 32, an imaging unit 32a and a light source 32b are disposed at positions facing the second surface S2 of the medium S conveyed. A backing section 32c of the second optical unit 32 is disposed at a position facing the first surface S1 of the medium S conveyed. The light source 32b emits light to the second surface S2, and the imaging unit 32a captures the image of the second surface S2 to generate image data of the second surface S2.

The image reading device 1-1 can generate image data of both sides of the medium S simultaneously using the first optical unit 31 and the second optical unit 32. In the first embodiment, the first optical unit 31 is disposed on the downstream side of the second optical unit 32 in the conveying direction, but the image reading device 1-1 is not limited to above configuration.

In some conventional image reading devices, the timings of the start and end of image reading are determined according to the results of the detection of the medium S by a sensor, such as a mechanical sensor, that directly detects the medium. A description will now be given of the case in which a mechanical sensor that directly detects the medium S is used. The mechanical sensor is disposed, for example, in the conveying passage 1 between the upstream feed rollers 21 and the second optical unit 32. When the mechanical sensor detects the medium S, image reading is started. When the medium S is no longer detected by the mechanical sensor, the image reading is ended. As will be described with reference to FIG. 6, a problem in this case is that, for example, large overscan area is required.

Figure 6:
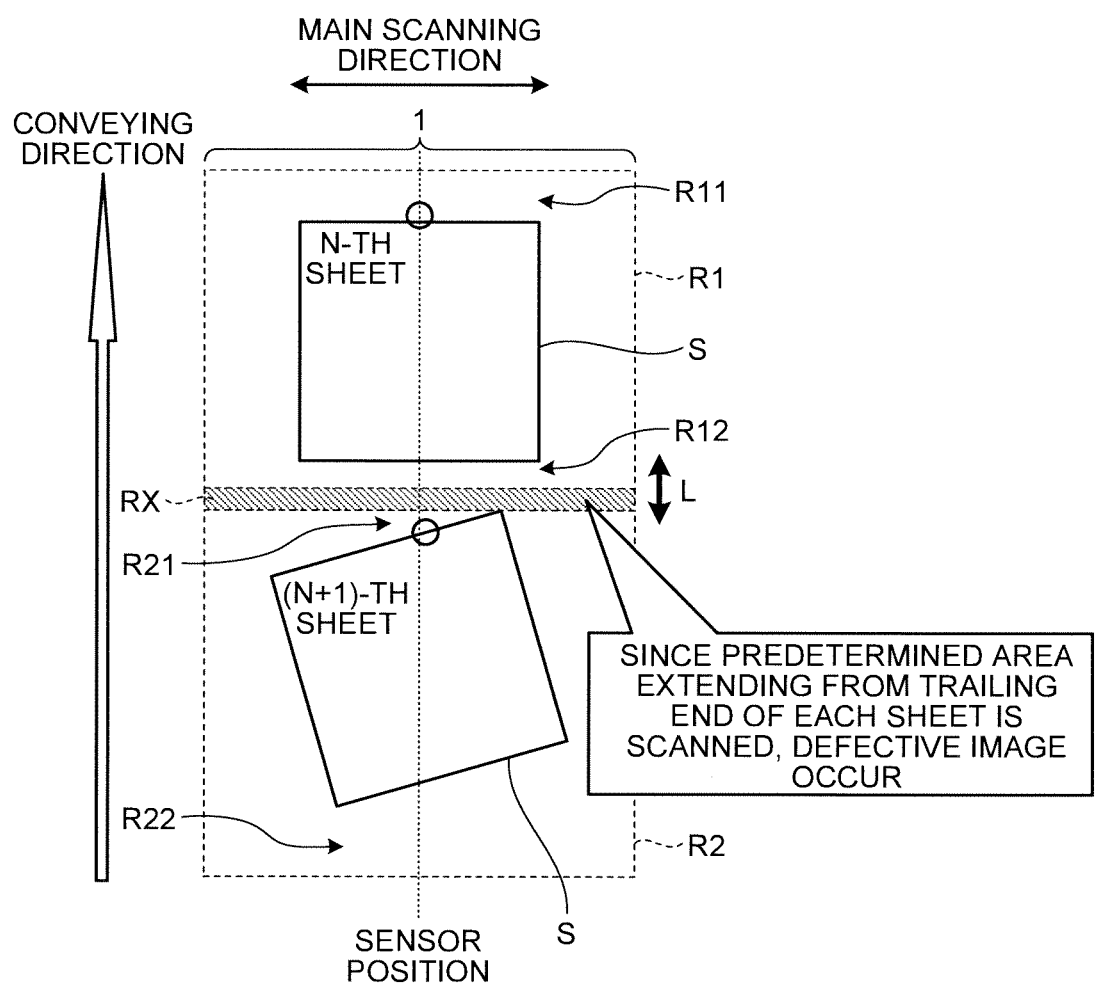
FIG. 6 is a diagram illustrating a problem in a conventional image reading device.

FIG. 6 is a diagram illustrating the problem in a conventional image reading device. FIG. 6 shows the problem when the image reading device including a mechanical sensor disposed in a central portion in a main scanning direction (the width direction of a conveying passage 1) reads a plurality of media S continuously. In FIG. 6, reference numeral R1 represents a scan area for an N-th medium or sheet S (N=1, 2, 3, . . . ), and reference numeral R2 represents a scan area for an (N+1)-th medium or sheet S.

To prevent defective image even when the medium S is, for example, skewed, the scan areas R1 and R2 include overscan areas provided on the leading and trailing (i.e., the upstream and downstream) sides of the media S in the conveying direction. Reference numerals R11 and R21 represent the upstream overscan areas for the media S, and reference numerals R12 and R22 represent the downstream overscan areas for the media S. When image reading is started, an upstream overscan area (R11 or R21) for the medium S is first read, i.e., the image reading is started before the estimated arrival time of the medium S at the reading line, which is estimated from the time at which the medium S is detected by the mechanical sensor. At the end of the image reading, a downstream overscan area (R12 or R22) is read, i.e., the image reading is continued even after the estimated completion time of the passage of the medium S through the reading line, which is estimated from the time at which the medium S is no longer detected by the mechanical sensor. For example, in an image reading device that detects skew after completion of the reading of the entire image of the medium S, the occurrence of skew is unknown at the time of reading the image. Therefore, overscan is indiscriminately performed with large overscan areas provided with margins even for the N-th medium S that is not skewed.

If the interval (sheet interval) L between the N-th and (N+1)-th media S in the conveying direction is too small, defective image can occur. If the sheet interval L is small, the scan area R1 for the N-th medium S and the scan area R2 for the (N+1)-th medium S overlap each other. The image data for the overlapping region RX is outputted as the image data for the N-th medium S. If the (N+1)-th medium S is skewed and a part thereof overlaps the region RX, defective image occurs in the image data for the (N+1)-th medium S.

Figure 7:
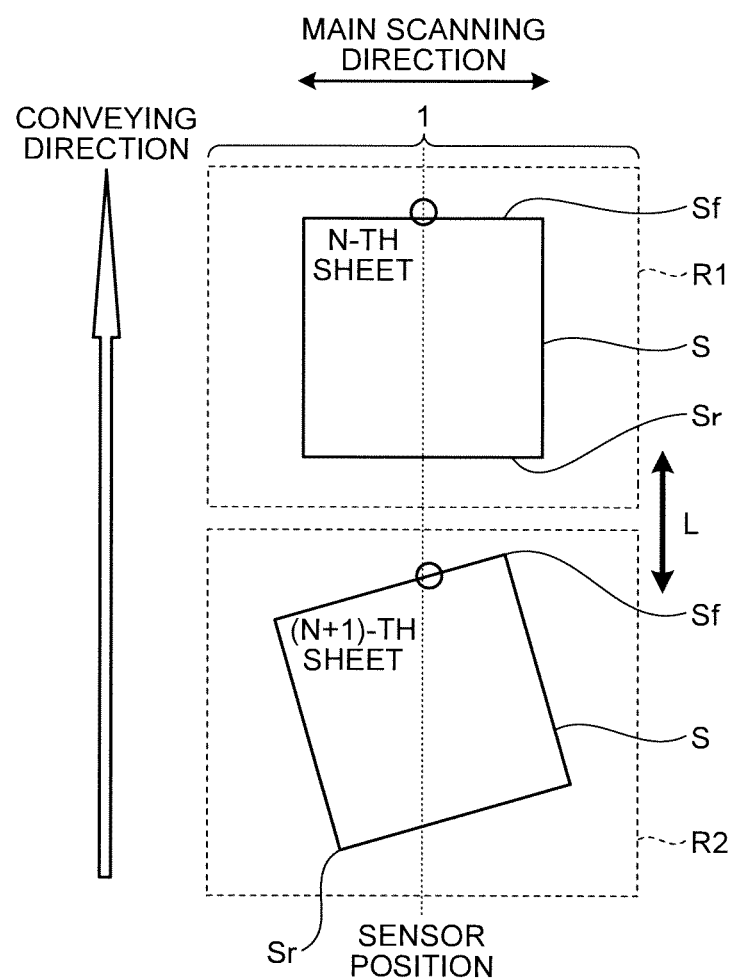
FIG. 7 is a diagram illustrating detection of a medium with a conventional mechanical sensor.

To prevent the occurrence of defective image, it is effective to increase the sheet intervals L. FIG. 7 is a diagram illustrating detection of a medium with the conventional mechanical sensor. When the sheet interval L between N-th and (N+1)-th media S is large, scan areas R1 and R2 do not overlap each other as shown in FIG. 7, and therefore defective image is prevented. Sf is the leading end of the medium S and Sr is a trailing end of the medium S. However, large overscan areas are provided not only for the (N+1)-th medium S that is skewed but also for the N-th medium S that is not skewed, and this results in a problem in that it is difficult to increase a reading speed per sheet. Desirably, the scan area of the medium S can be appropriately set according to the state of the media, e.g., the overscan areas can be reduced without causing defective image.

In the image reading device 1-1 of the first embodiment, the medium S is detected according to an image read by the imaging unit 31a, and the scan area is determined according to the detection results, as will be described below. More specifically, the scan area is determined according to the timing of the start of actually reading the image of the medium S by the imaging unit 31a and the timing of the end of reading the image of the medium S. Therefore, in the image reading device 1-1 of the first embodiment, an appropriate scan area can be provided for each medium S.

The system configuration of the image reading device 1-1 of the first embodiment will now be described with reference to FIG. 2. As shown in FIG. 2, the image reading device 1-1 includes, in addition to the components shown in FIG. 1, the first detection unit 33, a memory unit 34, and a control unit 35. As shown in FIG. 2, the imaging unit 31a, the first detection unit 33, the second detection unit 4, the memory unit 34, the control unit 35, the pick roller 10, and the feed rollers 20 are connected by communication lines for transmitting signals or commands so as to be capable of communicating with each other.

The first detection unit 33 is a unit which detects the medium S based on image data read by the imaging unit 31a. The first detection unit 33 detects the medium S based on, for example, image line data for one line that is sent from the imaging unit 31a. To detect the medium S according to the image data, for example, the image data generated by the imaging unit 31a is compared with preparedly stored background image data, and the comparison results are used for detection of the media. Specific examples of the method of detecting the medium S include: a detection method based on the difference in density between the medium S and the backing section 31c serving as the background; and a detection method using the shadow of the medium S that is projected onto the backing section 31c.

For example, when the medium S is detected using the difference in density between the backing section 31c and the medium S, priorly detected image line data of the backing section 31c is used as reference data, and this reference data is compared with image line data that is sent from the imaging unit 31a when the medium S is being conveyed. The reference data may be image line data read by the imaging unit 31a before the start of conveyance of the medium S. The first detection unit 33 detects the medium S according to the difference in density between data of each pixel in the image line data sent from the imaging unit 31a and the data of a corresponding pixel in the reference data. For example, when the image line data sent contains pixel data having density different from that of the reference data and difference of the densities exceeds a predetermined threshold value, a determination can be made that the medium S is on the reading line. In this case, the criterion for determining that the medium S is on the reading line may be that the image line data contains pixel data of at least a predetermined number of consecutive pixels having densities different from those in the reference data by more than the predetermined threshold value.

When the medium S is detected using its shadow, image line data, which is sent from the imaging unit 31a when the medium S is being conveyed, is compared with the reference data. The light source 31b irradiates the medium S, and its shadow is projected onto the backing section 31c. When the shadow is detected, a determination can be made that an edge of the medium S is on the reading line, i.e., the medium S is on the reading line. For example, if the image line data sent contains data of a pixel having a density different from that in the reference data by more than a predetermined threshold value, the first detection unit 33 can make a determination that the image line data contains the data of the shadow of the medium S. Instead of using the difference in density from the reference data to detect the shadow, pixel data having a density equal to or higher than a predetermined density may be detected as pixel data corresponding to the shadow. Any other known method of detecting the medium S according to image data may be used to detect the medium S.

The first detection unit 33 determines that a time when a status has changed from a status where the medium S is not detected to a status where the medium S is detected corresponds to a timing at which the leading end of the medium S is detected, and that a time when the status has changed from the status where the medium S is detected to the status where the medium S is not detected corresponds to a timing at which the trailing end of the medium S is detected.

The memory unit 34 stores various types of data. The memory unit 34 includes a readable and writable memory and can store image data outputted from the imaging unit 31a. The memory unit 34 can store image data of the entire part of the medium S including its overscan areas and an area spanning from the leading end to the trailing end.

The control unit 35 totally controls the image reading device 1-1. The control unit 35 controls the imaging unit 31a, the pick roller 10, and the feed rollers 20, respectively, according to the detection results from the first detection unit 33 and the second detection unit 4. The control unit 35 also controls communications between the image reading device 1-1 and external devices, such as a PC or a personal computer, connected thereto. The control unit 35 can output image data stored in the memory unit 34 to, for example, the PC.

The operation of the first embodiment will now be described with reference to FIG. 3. The control flow shown in FIG. 3 is started, for example, when an operator gives instructions to start reading.

At first, in step S10, the control unit 35 stores background information. The control unit 35 stores the background information, for example, during operation of the system, or at the time between the completion of reading the image of the medium S and the start of reading the image of the next medium S. The control unit 35 reads the image of the backing section 31c and stores the read image line data of the image of the backing section 31c as the background information.

Next, in step S20, the control unit 35 determines whether or not a document, i.e., the medium S, is present in the hopper 2. The control unit 35 makes the determination in step S20 according to the detection results from the empty-detection sensor 3. If the determination result shows that a document is present in the hopper 2 (Yes at step S20), the process proceeds to step S30. If the determination result is negative (No at step S20), the process proceeds to step S120.

In step S30, the control unit 35 starts prior reading. The prior reading is performed to buffer or temporarily store data of a margin area necessary for the image data of the leading end side of the medium S. The control unit 35 performs prior reading through the imaging unit 31a before the start of conveyance of the medium S and stores, as the margin area, image line data of a predetermined number of lines in the memory unit 34. After completion of the necessary prior reading, the control unit 35 waits for the arrival of the medium S, repeatedly reading image line data through the imaging unit 31a.

Next, in step S40, each of the pick roller 10 and the feed rollers 20 is brought into a forward rotation state under instructions from the control unit 35. More specifically, the control unit 35 drives the motor to rotate in a forward direction. The motor serves as driving source for the pick roller 10 or the first conveying unit. The forward direction is defined as a rotation direction that causes conveying force in the conveying direction to be exerted on the medium S which is in contact with the pick roller 10. The control unit 35 also controls the upstream feed rollers 21 and the downstream feed rollers 22, which serve as the second conveying unit, respectively, to rotate in the forward direction. More specifically, the control unit 35 drives motors for driving the driving rollers 21a and 22a to rotate in the forward direction. The forward direction is defined as a rotation direction that causes conveying force in the conveying direction to be exerted on the medium S which is in contact with the feed rollers 20. The forward rotation of the pick roller 10 causes one medium S in the hopper 2 to be fed to the conveying passage 1. The medium S fed by the pick roller 10 is sent in the conveying direction through the conveying passage 1 by the feed rollers 20. Steps S30 and S40 may be performed simultaneously. More specifically, the reading of the margin area and the actuation of the pick roller 10 and the feed rollers 20 may be started simultaneously.

Next, in step S50, the control unit 35 determines whether or not a document is on a position where the document is captured by the imaging unit 31a for sending the image data to the first detection unit 33, i.e., the document is on the reading line. The control unit 35 makes the determination in step S50 according to the detection results from the first detection unit 33. The first detection unit 33 refers to the image line data generated by the imaging unit 31a and stored in the memory unit 34 to detect the medium S according to the image line data. When the first detection unit 33 detects the medium S according to the image line data, the control unit 35 makes a positive determination in step S50. When the determination result shows that a document is on the first detection unit 33 (Yes at step S50), the process proceeds to step S60. When the determination result is negative (No at step S50), the determination in step S50 is repeated until a positive determination is made.

In step S60, the control unit 35 determines whether or not there is multi-feed in the second detection unit 4. More specifically, the control unit 35 determines whether or not the second detection unit 4 has detected multi-feed. When the determination result shows that there is multi-feed because the second detection unit 4 has detected multi-feed (Yes at step S60), the process proceeds to step S110. When the determination result is negative (No at step S60), the process proceeds to step S70.

In step S70, the control unit 35 stops the pick roller 10, but the feed rollers 20 remain in their forward rotation states. More specifically, the control unit 35 stops the rotation of the motor for the pick roller 10 to bring it into a freely rotatable state. The pick roller 10 is thereby brought into a state in which the rotation thereof follows the movement of the medium S conveyed by the feed rollers 20, i.e., into a driven state. More specifically, the control unit 35 stops driving the pick roller 10 while the feed rollers 20 are driven. The pick roller 10 is rotated by the conveying force of the feed rollers 20 that is transmitted through the medium S, and allows the medium S to be conveyed. The separation roller 11 is also rotated by the conveying force of the feed rollers 20 that is transmitted through the medium S, and allows the medium S to be conveyed. When the medium S is moved in the conveying direction and released from contact with the pick roller 10 and the separation roller 11, the pick roller 10 and the separation roller 11 stop rotating. As described above, the pick roller 10 is stopped being driven when the medium S is detected according to generated image data. Consequently, the pick roller 10 is stopped being driven before it starts conveying the next medium S subsequent to the detected medium S, i.e., the next medium S subsequent to the current imaging target medium S. Thus, the step S70 includes steps of, after detecting the medium conveyed based on the image data, stopping conveying a next medium fed subsequent to the medium conveyed before the first conveying unit starts conveying the next medium, and conveying the next medium, when the medium conveyed is no longer detected based on the image data. Accordingly, the image reading device is configured to stop conveying a next medium subsequent to the medium conveyed before the first conveying unit starts conveying the next medium, and to resume conveying the next medium when the medium conveyed is no longer detected based on the image data.

Next, in step S80, the control unit 35 validates the read data. More specifically, when the document is on the position where the document is captured by the imaging unit 31a for sending the image data to the first detection unit 33, i.e., the medium S is on the reading line of the imaging unit 31a, the control unit 35 validates the read image line data and stores the read data in the memory unit 34 as part of image data of the medium S. When no document is on the first detection unit 33, i.e., no medium S is on the reading line of the imaging unit 31a, the control unit 35 invalidates the read data. While the read data is invalidated, image line data is overwritten at a single address in the memory unit 34. For example, each time image line data is generated, the generated image line data is written at a single address in the memory unit 34 that is provided for storing the image line data of a first line (the leading end) of the medium S, until the leading end of the medium S is detected after completion of reading a margin.

When the read data is validated, image line data generated is stored at an address different from the addresses at which the previous image data has been stored. For example, the latest image line data read is stored at the address subsequent to the address for the last image line data stored. After the read data is validated, the image line data generated by the imaging unit 31a is added to the memory unit 34, and the image data of the entire medium S is thereby generated.

Next, in step S90, the control unit 35 determines whether or not the document is on the position where the document is captured by the imaging unit 31a for sending the image data to the first detection unit 33, i.e., the document is on the reading line. The control unit 35 makes the determination in step S90 according to the detection result from the first detection unit 33. When the determination result shows that the document is on the position where the document is captured by the imaging unit 31a for sending the image data to the first detection unit 33 (Yes at step S90), the determination in step S90 is repeated until a negative determination is made. When the determination result shows that no document is on the position where the document is captured by the imaging unit 31a for sending the image data to the first detection unit 33 (No at step S90), the process proceeds to step S100. More specifically, the image line data read by the imaging unit 31a is validated while the determination result shows that the document is present on the position where the document is captured by the imaging unit 31a for sending the image data to the first detection unit 33, and is stored in the memory unit 34 as part of the image of the medium S.

In step S100, the control unit 35 invalidates the read data. When the read data in a validated state is invalidated, the control unit 35 reads a margin area to complete the reading of the current reading target medium S. More specifically, while the pick roller 10 is stopped being driven, the control unit 35 instructs the imaging unit 31a to keep capturing the image, and stores the read image line data of the backing section 31c in the memory unit 34 as a margin area. The reading of the margin area is continued for, for example, a predetermined time. This predetermined time is, for example, the time to allow the imaging unit 31a to complete the generation of image data of a detected medium including a predetermined margin areas. The predetermined time is set, for example, as the time required for the imaging unit 31a to generate image line data of the backing section 31c, a predetermined number of times. As described above, even after the detected medium is no longer detected according to image data, the pick roller 10 is held in a non-driven state for the predetermined time. After execution of step S100, the process returns to step S10, and a next medium S is read. When the medium S is present in the hopper 2, the pick roller 10 is again driven, and the next medium S subsequent to the medium S of which image has been captured, i.e., the next medium S subsequent to the previously detected medium is fed from the hopper 2 by the pick roller 10.

When a positive determination is made in step S60, the process proceeds to step S110. In step S110, the control unit 35 issues error notification. For example, the control unit 35 actuates error notification means, such as a lamp or a display unit, provided in the image reading device 1-1 to notify the operator of the error. The control unit 35 also notifies an external device connected to the image reading device 1-1 of the occurrence of the error. After execution of step S110, the process proceeds to step S120.

In step S120, the control unit 35 stops the pick roller 10 and the feed rollers 20. More specifically, the control unit 35 stops the rotation of the motors for the pick roller 10 and the feed rollers 20. After execution of step S120, the control flow is ended.

As described above, in the image reading device 1-1 of the first embodiment, when the medium S is detected according to the image data generated by the imaging unit 31a (Yes at step S50) during conveyance of the medium S by the pick roller 10 and the upstream feed rollers 21 (step S40), the pick roller 10 is stopped being driven (step S70) before the pick roller 10 starts conveying the next medium S subsequent to the detected medium S. When the detected medium S is no longer detected according to image data (No at step S90), driving of the pick roller 10 is resumed (step S40).

The first embodiment also discloses an image reading method including first to third procedures described below.
First Procedure The pick roller 10 and the upstream feed rollers 21 are driven (step S40), and the imaging unit 31a is activated to capture images (step S30). Then the medium S is conveyed by the pick roller 10 and the upstream feed rollers 21 until the medium S is detected according to image data generated by the imaging unit 31a (during No at step S50).
Second Procedure After the medium S is detected according to image data (Yes at step S50), the pick roller 10 is stopped being driven (step S70) before the pick roller 10 starts conveying the next medium S subsequent to the detected medium S.
Third Procedure When the detected medium is no longer detected according to image data (No at step S90), driving of the pick roller 10 is resumed (step S40).

Figure 4:
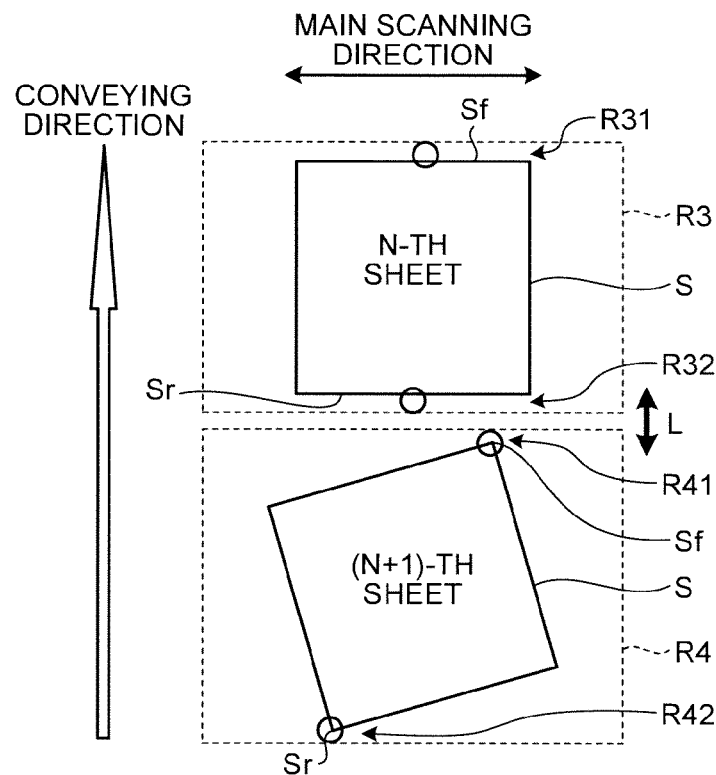
FIG. 4 is a diagram illustrating the scan area of the image reading device of the embodiments.

In the image reading device 1-1 and the image reading method of the first embodiment, the scan area of the medium S is determined according to image data read by the imaging unit 31a. Since the leading and trailing ends of the medium S can be detected even when the medium S is skewed, an appropriate scan area can be determined according to the state of the medium S. FIG. 4 is a diagram illustrating scan areas in the image reading device 1-1 in this embodiment. In FIG. 4, reference numeral R3 represents the scan area for an N-th medium or sheet S, and R4 represents the scan area for an (N+1)-th medium or sheet S. Reference numerals R31 and R41 represent overscan areas, i.e., margins, on the leading end side of the media S, and reference numerals R32 and R42 represent overscan areas, i.e., margins, on the trailing end side of the media S.

As shown in FIG. 4, in the image reading device 1-1 of the first embodiment, the leading end Sf and trailing end Sr of the medium S can be detected irrespective of whether or not the media is skewed. When the medium S is detected by a mechanical sensor (see FIG. 7), for example, large overscan areas must be provided, in case the mechanical sensor may detect points different from the leading end Sf and trailing end Sr of the medium S. However, in this embodiment, such large overscan areas are not necessary. Therefore, the overscan areas, i.e., margins, can be reduced, and this allows improvement in reading speed. Since the overscan areas can be small, the intervals L between sheets can be reduced, and the reading speed can thereby be increased. Since the scan area is determined according to the results of detection of the leading end Sf and trailing end Sr of the medium S such that at least the leading end Sf and trailing end Sr are included in the scan area, defective image is prevented.

Figure 5:
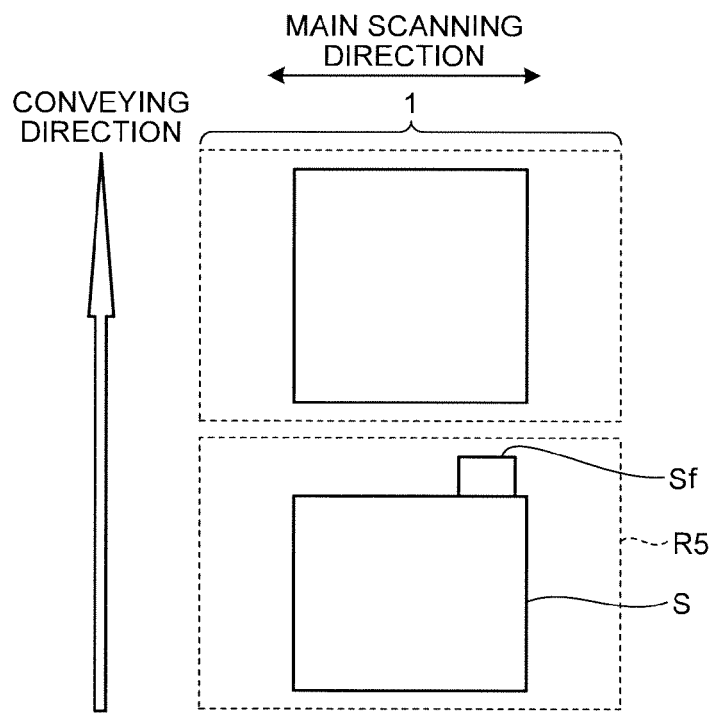
FIG. 5 is a diagram illustrating reading of a medium having an irregular shape.

In the image reading device 1-1 and the image reading method of the first embodiment, the scan area of the medium S can be appropriately determined even when the medium S has an irregular shape. FIG. 5 is a diagram illustrating reading of the medium S having an irregular shape. In FIG. 5, reference numeral R5 represents the scan area for the medium S having an irregular shape. Even for the medium S that has a portion having a certain width in the main scanning direction and protruding in the conveying direction as shown in FIG. 5, the image reading device 1-1 of the first embodiment can detect the leading end Sf and appropriately determine the scan area R5.

In the first embodiment, the margins on the upstream and downstream sides of the medium S are actually read by the imaging unit 31a. However, instead, image data of the medium S may be generated with a margin of a preparedly stored background color added to at least one of the upstream and downstream sides of the medium S. In this manner, the time for reading margin areas can be omitted.

In the first embodiment, detection of longitudinal streaks and brightness adjustment may be performed according to a background image captured when no medium S is on the reading line.

In the image reading device 1-1 of the first embodiment, images of both sides of the medium S can be captured simultaneously, but the image reading device 1-1 is not limited to this embodiment. Only the first optical unit 31 may be provided as an imaging optical unit.

Modification of First Embodiment

A modification of the first embodiment will be described. In the first embodiment, the image data of a first line is written in the same address in the memory unit 34 until the leading end of the medium S is detected by the first detection unit 33. However, instead, the image data of a plurality of lines may be stored in the memory unit 34 until the leading end of the medium S is detected. In this manner, if, for example, the medium S is detected with a delay, the stored image data is validated to generate the image data of the medium S.

For example, when the image data of five lines is always stored in the memory unit 34 until the leading end of the medium S is detected, the data stored in the memory unit 34 is updated with image line data outputted from the imaging unit 31a so that the image data of the latest five lines is stored in the memory unit 34. When the data of a plurality of lines is stored as described above, image data containing the data of the medium S can be prevented from being erased even when the medium S is detected with a time delay. In addition, in the detection of the medium S according to image line data, the leading end of the medium S can be more accurately detected using the image line data captured later. For example, the medium S may not be detected for some reason if a determination is made according to the captured image line data of only one line of the medium S. However, if the image line data of a plurality of lines is stored, a redetermination can be made according to the image line data captured later, so that the image line data of the previous line is determined to include the data of the medium S, thereby enabling to make the image line data of the previous line be valid. The leading and trailing ends of the medium S may be detected according to image data of not only one line but also a plurality of consecutive lines.

Second Embodiment

Figure 8:
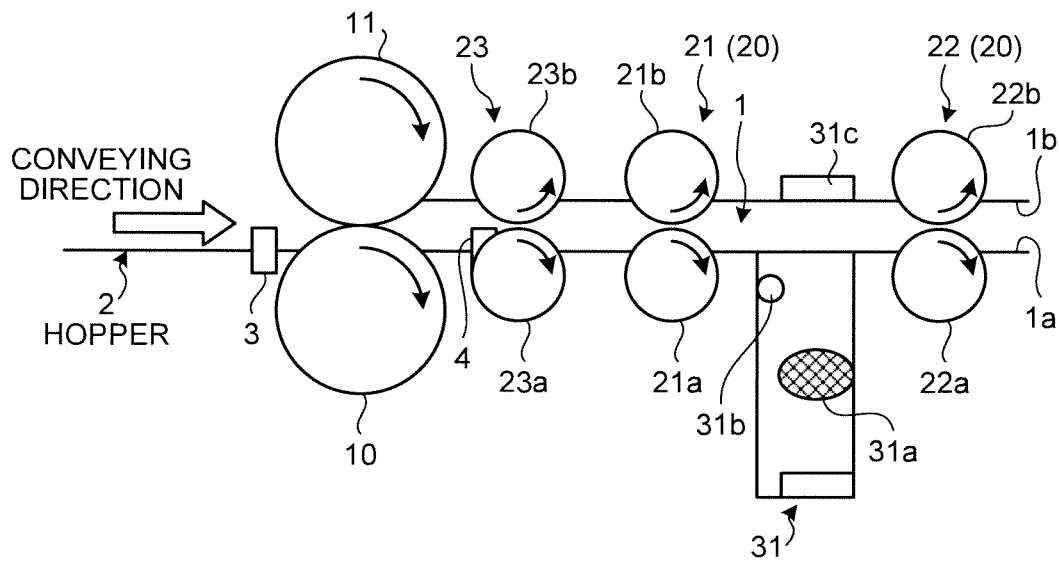
FIG. 8 is a diagram illustrating the schematic structure of an image reading device according to a second embodiment.
Figure 9:
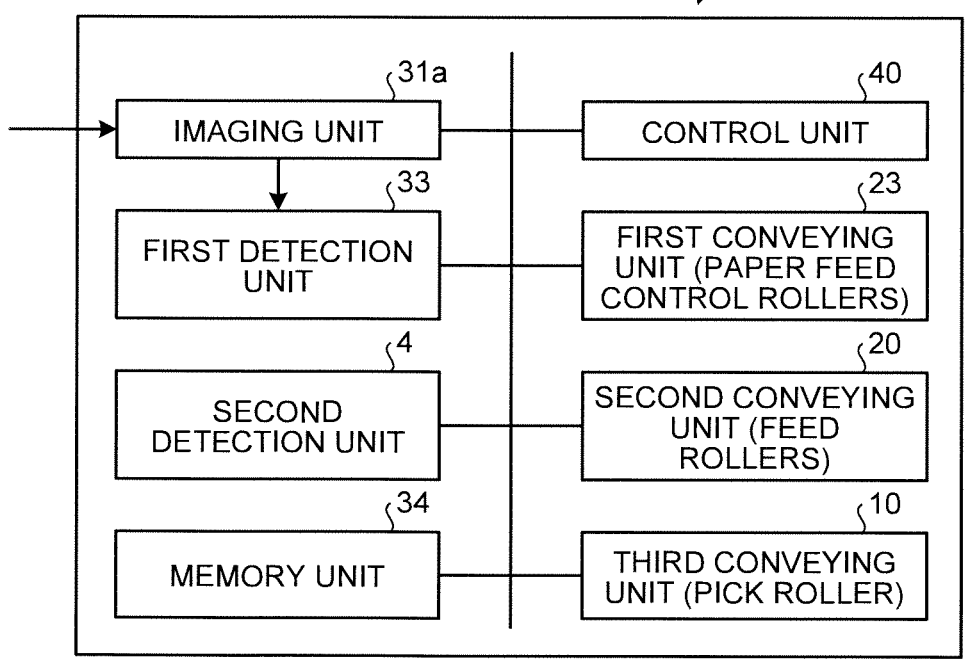
FIG. 9 is a diagram illustrating the system configuration of the image reading device of the second embodiment.
Figure 10:
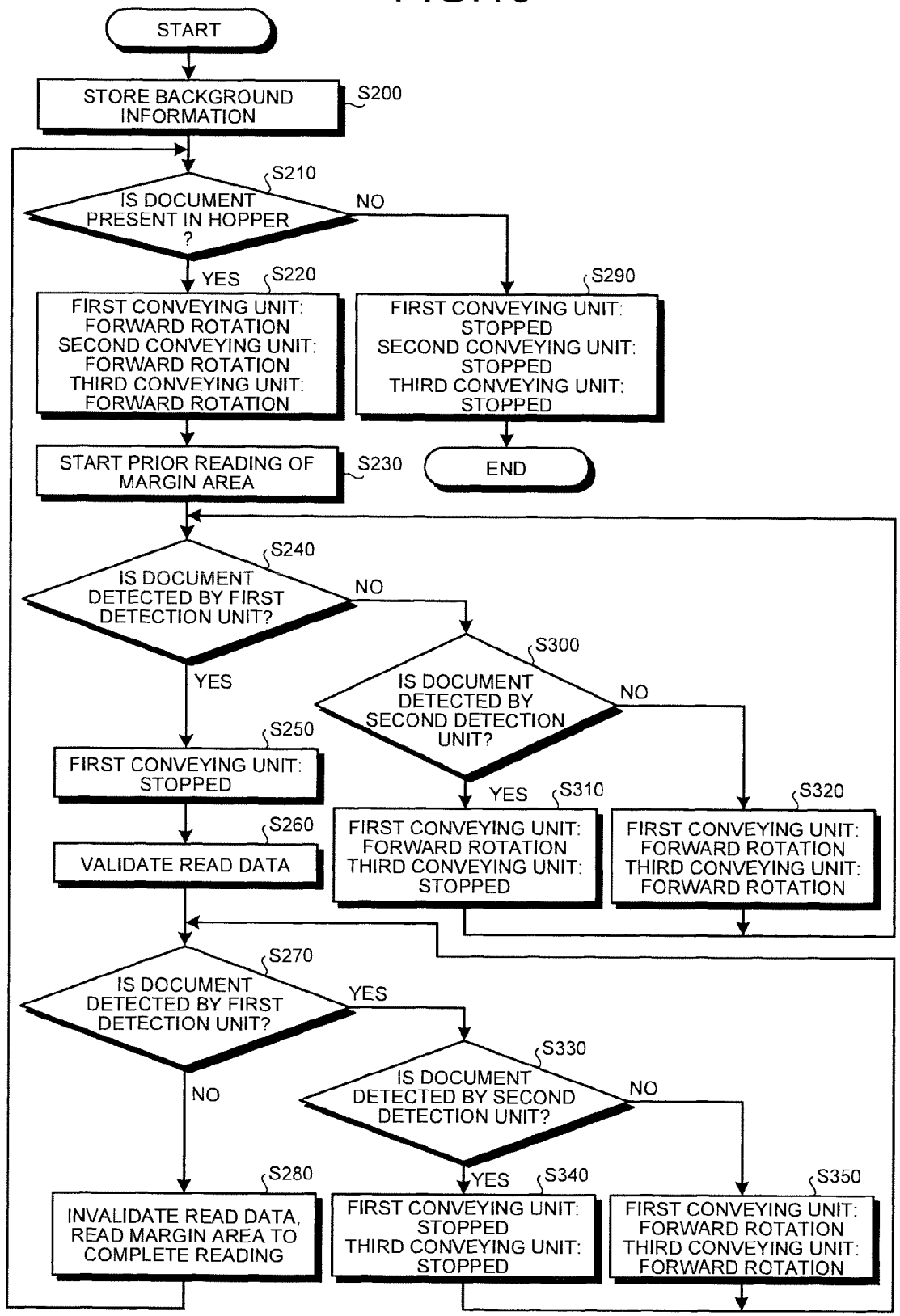
FIG. 10 is a flowchart showing the operation of the image reading device of the second embodiment.

A description will be given of a second embodiment. In the second embodiment, components having the same functions as those described in the above embodiment are denoted by the same reference numerals, and a redundant description will be omitted. FIG. 8 is a diagram illustrating the schematic structure of an image reading device according to the second embodiment, FIG. 9 is a diagram illustrating the system configuration of the image reading device of the first embodiment, and FIG. 10 is a flowchart showing the operation of the image reading device of the second embodiment.

As shown in FIG. 8, an image reading device 1-2 of the second embodiment includes paper feed control rollers 23. An image reading device 1-2 is not provided with a second optical unit 32 and reads only one side. In the image reading device 1-2 of the second embodiment, the paper feed control rollers 23 function as the first conveying unit instead of a pick roller 10 as used in the first embodiment. The paper feed control rollers 23 are disposed on the downstream side of the pick roller 10 in the conveying direction and on the upstream side of upstream feed rollers 21. The paper feed control rollers 23 is driven to send the medium S fed by the pick roller 10 and a separation roller 11, which constitute an auto document feed unit, in the conveying direction. The paper feed control rollers 23 include a driving roller 23a that is driven to rotate and a driven roller 23b that is supported while being pressed against the driving roller 23a. The driving roller 23a and the driven roller 23b are disposed on opposite sides of the conveying passage 1 for interposing the conveying passage 1 between the rollers 23a and 23b so that the rollers 23a and 23b sandwich the medium S conveyed between the rollers 23a and 23b.

The paper feed control rollers 23 rotate in a rotation direction that exerts conveying force towards the conveying direction on the medium S sandwiched between the driving roller 23a and the driven roller 23b. The paper feed control rollers 23 can switch between a driving state in which the conveying force directed in the conveying direction is exerted on the medium S and a non-driving state in which the conveying force is not exerted on the medium S. The paper feed control rollers 23 are driven by a motor which is not shown in the drawings. When driven by the motor, the paper feed control rollers 23 are in the driving state and rotate in the forward directions. When the motor stops driving the paper feed control rollers 23, they are brought into the non-driving state and do not exert the conveying force on the medium S.

A second detection unit 4 is disposed on the upstream side of the central axes of the paper feed control rollers 23 in the conveying direction and placed in close proximity to the paper feed control rollers 23. Therefore, the arrival of the leading end of the medium S at the paper feed control rollers 23 and the passage of the trailing end of the medium S through the paper feed control rollers 23 can be detected according to the detection results from the second detection unit 4. The second detection unit 4 may be a through beam sensor or an ultrasonic sensor used as the second detection unit 4 in the first embodiment. In the second embodiment, the second detection unit 4 detects the presence or absence of the medium S and may also detect multi-feed, as in the first embodiment.

The system configuration of the image reading device 1-2 will be described with reference to FIG. 9. The image reading device 1-2 includes, in addition to the components shown in FIG. 8, a first detection unit 33, a memory unit 34, and a control unit 40. The first detection unit 33 and the memory unit 34 may be the same as the first detection unit 33 and the memory unit 34 in the first embodiment. As shown in FIG. 9, the imaging unit 31a, the first detection unit 33, the second detection unit 4, the memory unit 34, the control unit 40, the pick roller 10, feed rollers 20, and the paper feed control rollers 23 are connected by communication lines for transmitting signals or commands so as to be capable of communicating with each other. In the second embodiment, the paper feed control rollers 23 may be denoted as a first conveying unit. The pick roller 10 may be denoted as a third conveying unit. As in the first embodiment, the feed rollers 20 may be denoted as a second conveying unit.

One difference between the control by the control unit 40 and the control by the control unit 35 in the first embodiment is that, when the trailing end of the medium S passes through the paper feed control rollers 23, the pick roller 10 feeds a next medium S to the paper feed control rollers 23 to prepare reading of the next medium S. In this manner, the intervals between sheets can be reduced, and the reading speed can thereby be increased.

The operation of the second embodiment will now be described with reference to FIG. 10. The control flow shown in FIG. 10 is started, for example, when an operator gives instructions to start reading. First, in step S200, the control unit 40 stores background information. The control unit 40 stores the background information in the same manner as in the control unit 35 of the first embodiment.

Next, in step S210, the control unit 40 determines whether or not a document is present in a hopper 2. When the determination result shows that a document is present in the hopper 2 (Yes at step S210), the process proceeds to step S220. When the determination result is negative (No at step S210), the process proceeds to step S290.

In step S220, each of the paper feed control rollers 23 serving as the first conveying unit, the feed rollers 20 serving as the second conveying unit, and the pick roller 10 serving as the third conveying unit is brought into a forward rotation state under instructions of the control unit 40. The forward directions of the paper feed control rollers 23 are rotation directions that cause conveying force in the conveying direction to be exerted on the medium S which is in contact with the driving roller 23a. The medium S fed from the hopper 2 by the pick roller 10 is conveyed to the paper feed control rollers 23 and then to the upstream feed rollers 21.

Next, in step S230, the control unit 40 starts prior reading. After completion of the necessary prior reading, the control unit 40, as in the control unit 35 of the first embodiment waits for the arrival of the medium S, repeatedly reading image line data through the imaging unit 31a.

Next, in step S240, the control unit 40 determines whether or not the document is detected by the first detection unit 33. The control unit 40 may make the determination in step S240 using the same method as that used in the control unit 35 of the first embodiment. When the determination result shows that the document is on the position where the document is captured by the imaging unit 31a for sending the image data to the first detection unit 33 (Yes at step S240), the process proceeds to step S250. When the determination result is negative (No at step S240), the process proceeds to step S300. More specifically, until the medium S fed from the hopper 2 reaches the first detection unit 33 (during No at step S240), the process proceeds to step S300.

In step S300, the control unit 40 determines whether or not the document is on the second detection unit 4. The control unit 40 makes the determination in step S300 according to the detection result from the second detection unit 4. When the determination result shows that the document is on the second detection unit 4 (Yes at step S300), the process proceeds to step S310. When the determination result is negative (No at step S300), the process proceeds to step S320.

In step S310, the control unit 40 stops the pick roller 10 serving as the third conveying unit, but the paper feed control rollers 23 serving as the first conveying unit remain in their forward rotation states. The pick roller 10 is thereby brought into a driven state. When the second detection unit 4 has detected the medium S, the leading end of the medium S has reached the paper feed control rollers 23, and the medium S is conveyed by the paper feed control rollers 23 in the conveying direction. Therefore, the medium S can be conveyed even when the pick roller 10 is stopped. After execution of step S310, the process proceeds to step S240.

In step S320, the control unit 40 maintains the forward rotation states of the paper feed control rollers 23 and the pick roller 10. When no medium S is detected by the second detection unit 4, the leading end of the medium S has not reached the paper feed control rollers 23. Therefore, the pick roller 10 in the forward rotation state conveys the medium S. After execution of step S320, the process proceeds to step S240.

When the medium S reaches the reading line of the imaging unit 31a and a positive determination is made in step S240, the process proceeds to step S250. In step S250, the control unit 40 stops the paper feed control rollers 23 serving as the first conveying unit. More specifically, the rotation of the motor for the paper feed control rollers 23 is stopped, and the paper feed control rollers 23 are brought into a driven state in which the rotation thereof follows the movement of the medium S conveyed. When the medium S has reached the imaging unit 31a, the medium S is being conveyed by the upstream feed rollers 21. Therefore, even when the paper feed control rollers 23 are stopped, the medium S can be conveyed.

Next, in step S260, the control unit 40 validates the read data. After the read data is validated, image line data generated by the imaging unit 31a is added to the memory unit 34, and the image data of the entire medium S is thereby generated.

Next, in step S270, the control unit 40 determines whether or not the document is on the position where the document is captured by the imaging unit 31a for sending the image data to the first detection unit 33. When the determination result shows that the document is on the position where the document is captured by the imaging unit 31a for sending the image data to the first detection unit 33 (Yes at step S270), the process proceeds to step S330. When the determination result is negative (No at step S270), the process proceeds to step S280.

In step S280, the control unit 40 invalidates the read data, reads a margin area, and completes the reading. After execution of step S280, the process proceeds to step S210.

In step S330, the control unit 40 determines whether or not a document is on the second detection unit 4. when the determination result shows that a document is on the second detection unit 4 (Yes at step S330), the process proceeds to step S340. When the determination result is negative (No at step S330), the process proceeds to step S350.

In step S340, the control unit 40 stops the paper feed control rollers 23 and the pick roller 10. Since the detected medium, which is the medium S currently read by the imaging unit 31a, has not passed through the second detection unit 4, the control unit 40 stops driving the paper feed control rollers 23 and the pick roller 10 until the medium S passes through the second detection unit 4. After execution of step S340, the process proceeds to step S270.

In step S350, the control unit 40 controls the paper feed control rollers 23 and the pick roller 10 to rotate in forward rotation states. Since the detected medium has passed through the second detection unit 4, the pick roller 10 is driven to feed the next medium S subsequent to the detected medium to the paper feed control rollers 23. After execution of step S350, the process proceeds to step S270. When the next medium S fed by the pick roller 10 reaches the paper feed control rollers 23, a positive determination is made in step S330, and the pick roller 10 and the paper feed control rollers 23 are stopped. The next medium S is thereby stopped when it reaches the paper feed control rollers 23 and waits until the reading of the detected medium is completed.

If a negative determination is made in step S210, the process proceeds to step S290. In step S290, the control unit 40 stops the paper feed control rollers 23, the feed rollers 20, and the pick roller 10. Since no document remains in the hopper 2 and all the documents have been read, image reading is stopped. After execution of step S290, the control flow is ended.

As described above, in the image reading device 1-2 of the second embodiment, when the medium S is detected according to the image data generated by the imaging unit 31a (Yes at step S240) during conveyance of the medium S by the paper feed control rollers 23 and the upstream feed rollers 21 (step S220), the paper feed control rollers 23 and the pick roller 10 are stopped being driven (step S340) before the paper feed control rollers 23 start conveying the next medium S which is fed subsequent to the detected medium, namely the medium S already conveyed. When the detected medium is no longer detected according to image data (No at step S270), the controller 40 resumes driving the paper feed control rollers 23 and the pick roller 10 (step S220).

In addition, in the image reading device 1-2, after the medium S is detected according to image data, the controller 40 drives the pick roller 10 (step S350) until the next medium S subsequent to the detected medium reaches the paper feed control rollers 23 (during No at step S330).

Therefore, in the image reading device 1-2 of the second embodiment, during reading of the detected medium, the next medium S is sent to the paper feed control rollers 23. In this manner, the intervals between sheets can be reduced, and the reading speed can thereby be increased.

In the second embodiment, the paper feed control rollers 23 and the pick roller 10 are stopped being driven at the timing at which the next medium S subsequent to a detected medium reaches the paper feed control rollers 23. However, the timing at which the paper feed control rollers 23 and the pick roller 10 are stopped being driven is not limited thereto. The paper feed control rollers 23 and the pick roller 10 may be stopped being driven at any timing before the paper feed control rollers 23 start conveying the next medium S subsequent to the detected medium. The timing when the controller 40 stops driving the paper feed control rollers 23 and the timing when the controller 40 stops driving the pick roller 10 is not necessary the same. When the paper feed control rollers 23 are stopped being driven, a part of the next medium S, e.g., the leading end of the next medium S, may be sandwiched between the paper feed control rollers 23. More specifically, the procedure of stopping the paper feed control rollers 23 and the pick roller 10 before the paper feed control rollers 23 start conveying the next medium S includes the procedure of stopping the paper feed control rollers 23 and the pick roller 10 at the timing at which the next medium S reaches the paper feed control rollers 23. With this procedure, the paper feed control rollers 23 can immediately start conveying the next medium S when again driven.

When a detected medium S is no longer detected and the controller 40 resumes driving the paper feed control rollers 23 and the pick roller 10, timings of resuming driving the paper feed control rollers 23 and the pick roller 10 are not necessary the same. More specifically, each of the paper feed control rollers 23 and the pick roller 10 may be again driven at any timing after the detected medium S is no longer detected according to image data.

The second embodiment also discloses an image reading method using the image reading device 1-2 that includes first to third procedures described below.

First Procedure

The paper feed control rollers 23 and the upstream feed rollers 21 are actuated or driven (step S220), and the imaging unit 31a is activated to capture images (step S230). Then the medium S is conveyed by the paper feed control rollers 23 and the upstream feed rollers 21 until the medium S is detected according to image data generated by the imaging unit 31a (during No at step S240).

Second Procedure

After the medium S is detected according to image data (Yes at step S240), the paper feed control rollers 23 and the pick roller 10 are stopped being driven (step S340) before the paper feed control rollers 23 starts conveying the next medium S subsequent to the detected medium S.

Third Procedure

When the detected medium is no longer detected according to image data (No at step S270), driving of the paper feed control rollers 23 and the pick roller 10 is resumed (step S220).

In the second embodiment, one pair of paper feed control rollers 23 is used. However, a plurality of pairs of paper feed control rollers 23 may be disposed between the pick roller 10 and the upstream feed rollers 21. A combination of the paper feed control rollers 23, the pick roller 10, and the upstream feed rollers 21 may be used as the first conveying unit. In this case, for example, the driving and stopping states of the pick roller 10 may be always synchronized with the driving and stopping states of the paper feed control rollers 23.

In the image reading device of the present invention, when a medium that is being conveyed by the first and second conveying units is detected according to image data generated by the imaging unit, conveyance of a next medium fed subsequent to the medium conveyed is stopped before the first conveying unit starts conveying the next medium and conveyance of the next medium is resumed when the medium conveyed is no longer detected based on the image data. Therefore, advantageously, the intervals between a plurality of sequentially conveyed media during reading of the images of the media can be appropriately determined.

Although the invention has been described with respect to specific embodiments for a complete and clear disclosure, the appended claims are not to be thus limited but are to be construed as embodying all modifications and alternative constructions that may occur to one skilled in the art that fairy fall within the basic teaching herein set forth.

What is claimed is:

1. An image reading device comprising:
a first conveying unit that sequentially feeds a plurality of media to be read placed in a tray one by one in a conveying direction;
a second conveying unit that is disposed downstream of the first conveying unit in the conveying direction and conveys, in the conveying direction, the plurality of media to be read, which is fed one by one by the first conveying unit; and an image capturing unit that is disposed downstream of the second conveying unit in the conveying direction, and captures an image of a medium conveyed thereto and outputs an electric signal as image line data to generate image data of the medium, wherein:

the image reading device is configured to detect the medium conveyed based on the image line data output from the image capturing unit when the medium is conveyed by the first conveying unit and the second conveying unit, and the image reading device is configured to stop conveying a next medium subsequent to the medium conveyed before the first conveying unit starts conveying the next medium when the medium conveyed is being detected based on the image line data output from the image capturing unit, and to resume conveying the next medium when the medium conveyed is no longer detected based on the image line data output from the image capturing unit.

2. The image reading device according to claim 1, wherein the image reading device is further configured to keep on stopping driving the first conveying unit for a period of time that allows the image capturing unit to output image line data of the medium that includes predetermined margin data after the medium is no longer detected.

3. The image reading device according to claim 1, wherein the image reading device is further configured to detect the medium based on results of comparison between stored image data of a background and the image line data output by the image capturing unit.

4. An image reading device comprising:

an automatic document feeder that sequentially feeds a plurality of media to be read placed in a tray one by one in a conveying direction;

a first conveying unit that is disposed downstream of the automatic document feeder in the conveying direction and conveys a medium to be read fed from the automatic document feeder in the conveying direction;

a second conveying unit that is disposed downstream of the first conveying unit in the conveying direction and conveys the medium to be read, which is fed by the first conveying unit in the conveying direction; and an image capturing unit that is disposed downstream of the second conveying unit in the conveying direction, and captures an image of the medium conveyed and outputs an electric signal as image line data to generate image data of the medium, wherein:

the image reading device is configured to detect the medium conveyed based on the image line data output from the image capturing unit when the medium is conveyed by the first conveying unit and the second conveying unit, and the image reading device is configured to stop driving the first conveying unit and the automatic document feeder before the first conveying unit starts conveying a next medium subsequent to the medium conveyed when the medium conveyed is being detected based on the image line data output from the image capturing unit, and to resume driving the first conveying unit and the automatic document feeder when the medium conveyed is no longer detected based on the image line data output from the image capturing unit.

5. The image reading device according to claim 4, wherein the image reading device is further configured to drive the automatic document feeder after the medium conveyed is detected and until the next medium subsequent to the medium conveyed reaches the first conveying unit.

6. The image reading device according to claim 4, wherein the image reading device is further configured to keep on stopping driving the first conveying unit for a period of time that allows the image capturing unit to output image line data of the medium that includes predetermined margin data after the medium is no longer detected.

7. The image reading device according to claim 4, wherein the image reading device is further configured to detect the medium based on results of comparison between stored image data of a background and the image line data output from the image capturing unit.

8. An image reading method comprising:

feeding a plurality of media placed in a tray one by one in a conveying direction by a first conveying unit;

conveying a medium to be read among the plurality of media fed in the feeding toward an image capturing unit until the medium is captured by the image capturing unit, using the first conveying unit and a second conveying unit which is disposed downstream of the first conveying unit in the conveying direction;

capturing, by the image capturing unit, an image of the medium conveyed, outputting an electric signal as image line data to generate image data of the medium conveyed;

detecting the medium conveyed based on the image line data output from the image capturing unit; and while detecting the medium conveyed based on the image line data output from the image capturing unit, stopping conveying a next medium fed subsequent to the medium conveyed before the first conveying unit starts conveying the next medium, and conveying the next medium, when the medium conveyed is no longer detected based on the image line data output from the image capturing unit.

9. The image reading device according to claim 1, further comprising a memory unit, wherein the line image data output from the image capturing unit are accumulated in the memory unit to generate the image data of the medium during the medium conveyed is being detected.

10. The image reading device according to claim 4, further comprising a memory unit, wherein the line image data output from the image capturing unit are accumulated in the memory unit to generate the image data of the medium during the medium conveyed is being detected.

11. The image reading method according to claim 8, wherein the line image data output from the image capturing unit are accumulated in a memory unit to generate the image data of the medium during the medium conveyed is being detected.

* * * * *